Sept. 23, 1924.

W. MACGREGOR 1,509,562

ROTATABLE PIPE JOINT

Filed May 8, 1922

INVENTOR
W. MACGREGOR

BY
ATTYS.

Patented Sept. 23, 1924.

1,509,562

UNITED STATES PATENT OFFICE.

WALLACE MACGREGOR, OF BERKELEY, CALIFORNIA.

ROTATABLE PIPE JOINT.

Application filed May 8, 1922. Serial No. 559,189.

*To all whom it may concern:*

Be it known that I, WALLACE MACGREGOR, a citizen of the United States, residing at Berkeley, in the county of Alameda and State of California, have invented new and useful Improvements in Rotatable Pipe Joints, of which the following is a specification.

The present invention relates to improvements in rotatable joints for pipes, conduits and the like and has particular reference to a novel simple and efficient joint device by means of which a leak proof joint may be established between two pipe or conduit elements and either of said elements may be rotated relative to the other without disturbing the seal at the joint.

The primary object of the invention is to provide a joint device of the character described which will be particularly useful in and around industrial plants, wharves, ships and inland irrigation systems, in that it will provide for the turning or rotating of one of the pipe or conduit elements which it joins through 360° of arc without rendering the joint less tight or interfering with the free passage of fluid through the joint and thereby provides a simple and inexpensive means for conveying fluids in different directions as desired.

Another object of the invention is to provide a joint of the character described which will be inexpensive not liable to get out of order and which may be quickly and easily set up or taken down it not being necessary to use rubber or other gaskets packing or washers.

The invention possesses other advantages and features some of which, with the foregoing will be set forth at length in the following description where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claims may be embodied in a plurality of forms.

Referring to the drawings.

Figure 1:
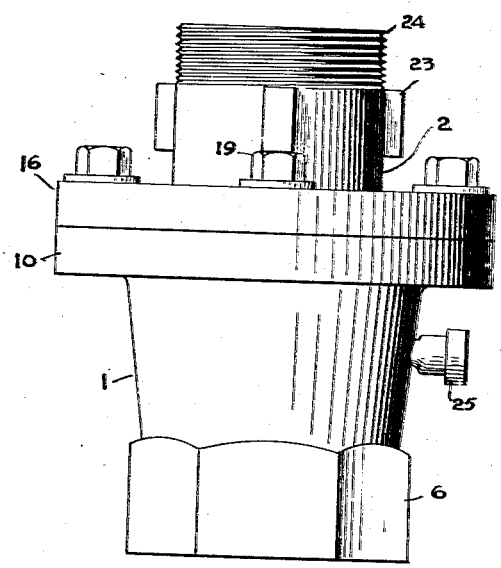
Fig. 1 represents a side elevation of the joint of my invention.
Figure 2:
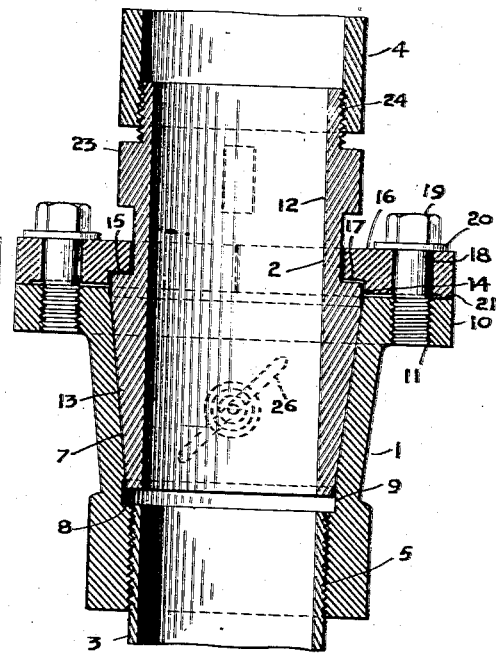
Fig. 2 represents a vertical sectional view of the joint.
Figure 3:
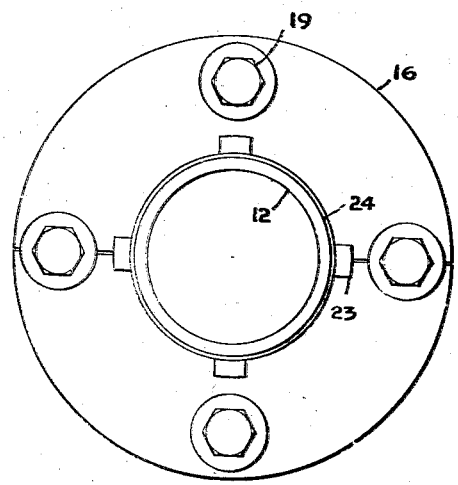
Fig. 3 represents a top plan view of the joint.

Referring in detail to the invention as shown in the drawing, 1 and 2 designate telescopically fitted joint members and 3 and 4 pipe or conduit sections connected by the joint members.

The joint member 1 is in the form of a hollow casting having its bore at one end reduced and internally screw threaded as at 5 to receive the pipe 3 there being a hexagonal exterior end portion 6 to facilitate the turning of the joint member. A frustro-conical seat 7 is formed in the joint member 1 and extends from near the shoulder 8, which latter is provided by reducing the bore, to near the other end of the joint member. The end of the seat or bore adjacent to the shoulder is cylindrically formed as at 9 for a short distance for a purpose which will be later more fully described. At the end of the member 1 opposite the hexagonal portion 6 an annular flange 10 is provided, said flange being provided with screw threaded openings 11.

The joint member 2 is provided with a bore 12 of equal diameter from one end of the joint member to the other, the diameter of the bore being substantially equal to that of the diameter of the pipe 3 whereby when the joint members are fitted together there will be no obstruction to stop the flow of the fluid through the joint. The joint member 2 is enlarged exteriorly from one end to a mediate portion thereof so as to provide a frusto-conical bearing portion 13 adapted to seat against the seat 7, said bearing portion being of greater length than the seat. The inner end of the member 2 is disposed in spaced relation to the shoulder 8 and the outer end of the frustro-conical portion will be disposed in outwardly spaced relation to the corresponding end of the seat 7. The outer end of the portion 13 is ground so as to be cylindrical as at 14 for a short distance but such that said cylindrical portion will extend above and below the outer end of the seat 7. By this arrangement and the similar cylindrical formation at the inner end of the seat 7, the frusto-conical portion 13 may be forced tightly against the seat without wedging. This wedging action would occur were sharp edges provided at the terminations of the engaged portions of said seat and frustro-conical bearing portions.

The formation of the frustro-conical bearing portion provides an annular shoulder 15 intermediate of the ends of the member 2 and this shoulder when the members are fitted together will be disposed in outwardly spaced relation to the flange 10. A split ring 16 is mounted upon the flange 10 and is cut away from its lower side at its inner edge to provide an overhanging shoulder 17 which engages the shoulder 10 to hold the coupling members seated. A plurality of openings 18 are formed through the ring 16 and are adapted to register with the openings 11. Two of these openings 18 are extended through the ring where split so that all of the bolts 19 employed for holding the ring upon the flange need not be removed in order to take off the ring, it only being necessary to remove the bolts which extend through the undivided openings. If desired, washers 20 may be employed in connection with the bolts.

The under face of the ring is cut away or recessed so as to provide an annular bead or shoulder 21 at the outer edge of the ring and to space the major portion of the under face of the ring from the flange. By this arrangement a tight joint will be provided between the ring and flange at the outer edge sufficient to keep out dust and dirt. By spacing the ring for the most part from the flange 10, binding of the shoulder 17 against the shoulder 15 is prevented and free rotation of either will be provided for.

The member 2 is provided with a plurality of lugs or projections 23 by means of which said member may be readily turned as desired. The outer end of the member 2 is externally screw threaded as at 24 to provide for connection with the pipe or fitting 4.

Due to the comparatively large area of the seated portions of the joint members, both members will be freely relatively rotatable and a leak proof joint will be provided without requiring the use of rubber gaskets or packing of any sort. Due to the fact that either member may be freely rotated the joint will provide for the conveying of fluids in different directions as desired without weakening the joint or rendering it any less tight. By combining one or more joints constructed in accordance with the invention, provision is made for conveying fluids in various directions not ordinarily possible with the standard type of pipe joints or couplings. The straight walls through the bore or joint being of substantially the same diameter as that of the pipe 3 leading from the joint will permit of an unobstructed flow of fluid without lessening the fluid pressure. When the joint becomes worn, by tightening the screws holding the ring, the frustro-conical member will be pushed inwardly so as to compensate for wear and will seat properly against the seat 7.

The member 1 may be provided with an oil or grease cup 25 arranged to deliver lubricant to a groove 26 in the bearing face of the portion 13 whereby the joint will be sufficiently lubricated.

Figure 4:
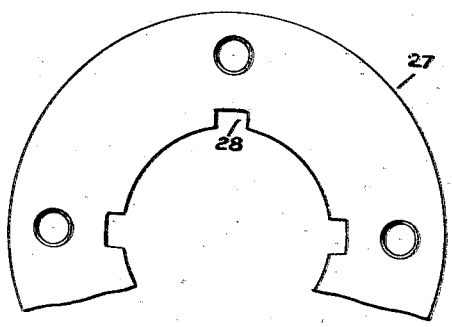
Fig. 4 represents a fragmentary top plan view of a modified form of locking ring.

As shown in Fig. 4 the locking ring 27 may be in one piece. To facilitate assembling the structure with such a ring there are provided notches 28 in the inner edge of the ring whereby the ring may be fitted over the outer end of the member 2 and moved inwardly into place, the lugs 23 passing freely through the notches.

Preferably the joint, as shown, is set up so that the flow of fluid is in the direction from the member 2 towards the member 1, or in other words, from the pipe or fitting 4, towards the pipe or fitting 3, but it is to be understood that either of the joint members may be rotated or made rigid as desired, depending upon the use to which the joint is put.

Due to the cylindrical portion 14 extending into the frustro-conical seat a short distance, there is provided an annular substantially V-shaped channel or space between the joint members, which channel or space may serve as a lubricant reservoir for lubricants which may be readily directed into the joint through the notches 28 provided in the ring 27. This storage of a quantity of lubricant insures a proper lubrication of the joint where the inner end of the cylindrical portion 14 engages the frustro-conical seat 7.

I claim:

1. A coupling comprising a joint member having at one end means providing for its connection with a pipe or fitting and provided with a frustro-conical seat, one end of said seat terminating in a cylindrical portion, another joint member having a frustro-conical portion engaging in said frustro-conical seat with the inner end of said frustro-conical portion extending into and spaced circumferentially from said cylindrical portion, said frustro-conical portion terminating at its outer end in a cylindrical portion, which cylindrical portion extends into the outer end of the frustro-conical seat.

2. A coupling comprising a joint member having a frustro-conical seat, another joint member provided with an exterior frustro-conical portion engaging in the frustro-conical seat, which frustro-conical portion defines at one end an annular shoulder a ring, a flange on the first named joint member upon which said ring engages, said ring having its surface opposed to the flange recessed from a point spaced inwardly from the outer perimeter of the ring to the inner perimeter of the ring whereby the ring for the most part is spaced above said flange and a portion on said ring overlying and engaging said shoulder and screws extending through the ring and adjustably engaging with the flange.

3. A coupling comprising a joint member having a frustro-conical seat, another joint member provided with an exterior frustro-conical portion engaging in the frustro-conical seat which frustro-conical portion defines at one end an annular shoulder member, a ring, a flange on the first named joint member upon which said ring engages, said ring having its surface opposed to said flange recessed from a point spaced inwardly from the outer perimeter of the ring to the inner perimeter of the ring whereby the ring for the most part is spaced above said flange, a portion on said ring overlying and engaging said shoulder, screws extending through the ring and adjustably engaging with the flange and lugs on the second joint member, said ring having notches therein through which the lugs may extend in mounting and removing the ring.

WALLACE MACGREGOR.